United States Patent
Bretfeld et al.

(10) Patent No.: US 6,601,515 B2
(45) Date of Patent: *Aug. 5, 2003

(54) IGNITION ELEMENT, IN PARTICULAR FOR PYROTECHNIC MIXTURES

(75) Inventors: Anton Bretfeld, Furth (DE); Harald Frank, Furth (DE); Jiang Zhang, Nurnberg (DE)

(73) Assignee: Dynamit Nobel GmbH Explosivstoff-und Systemtechnik, Troisdorf (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/331,779
(22) PCT Filed: Dec. 19, 1997
(86) PCT No.: PCT/EP97/07163
§ 371 (c)(1), (2), (4) Date: Aug. 11, 1999
(87) PCT Pub. No.: WO98/28167
PCT Pub. Date: Jul. 2, 1998

(65) Prior Publication Data
US 2002/0056394 A1 May 16, 2002

(30) Foreign Application Priority Data
Dec. 24, 1996 (DE) .......................... 196 54 314

(51) Int. Cl.⁷ ............................... F42C 13/04
(52) U.S. Cl. .............. 102/202.14; 102/202.5; 102/202.9; 102/202.12
(58) Field of Search ............ 102/202.5, 202.9, 102/202.12, 202.14, 275.7, 275.12, 319, 288, 289, 200; 100/736, 737, 740–742

(56) References Cited

U.S. PATENT DOCUMENTS

| | | | | |
|---|---|---|---|---|
| 3,746,214 A | * | 7/1973 | Stephenson | 222/3 |
| 4,353,304 A | * | 10/1982 | Hubsch et al. | 102/202.14 |
| 4,503,773 A | * | 3/1985 | Bolieau | 102/202 |
| 4,815,382 A | * | 3/1989 | Yunan | 102/275.7 |
| 5,433,147 A | * | 7/1995 | Brede et al. | 102/202.2 |
| 5,602,359 A | * | 2/1997 | Hambro et al. | 102/202.5 |
| 5,621,183 A | * | 4/1997 | Bailey | 102/202.7 |
| 5,735,626 A | * | 4/1998 | Khatiblou et al. | 403/16 |

FOREIGN PATENT DOCUMENTS

| | | | |
|---|---|---|---|
| DE | 2298477 A | * | 4/1995 |
| EP | 0512682 A | * | 3/1992 |
| WO | 9410528 A | * | 10/1993 |

* cited by examiner

Primary Examiner—Michael J. Carone
Assistant Examiner—Troy Chambers
(74) Attorney, Agent, or Firm—Antonelli, Terry, Stout & Kraus, LLP

(57) ABSTRACT

An igniter element has two contacts (12, 13) which are on the contact side of a support body (11), and which are connected via a resistance element (15). By current feed to the contacts (12, 13), a primer mix (17) is ignited on one active side of the support body (11). The support body (11) is placed in a fixing device (10), whereby the former is fitted with at least one stop spring (18) which catches on a stop shoulder (21) of the holding device. Furthermore, the support body (11) has a recess (22) on the front-side in the region of the stop spring (18), which recess is open in the direction of the active side. After igniting the primer mix (17), pressure builds up on the active side, so that the outer surface (23) of the stop spring (18) is pressed against the inner surface of the fixing device (10).

7 Claims, 1 Drawing Sheet

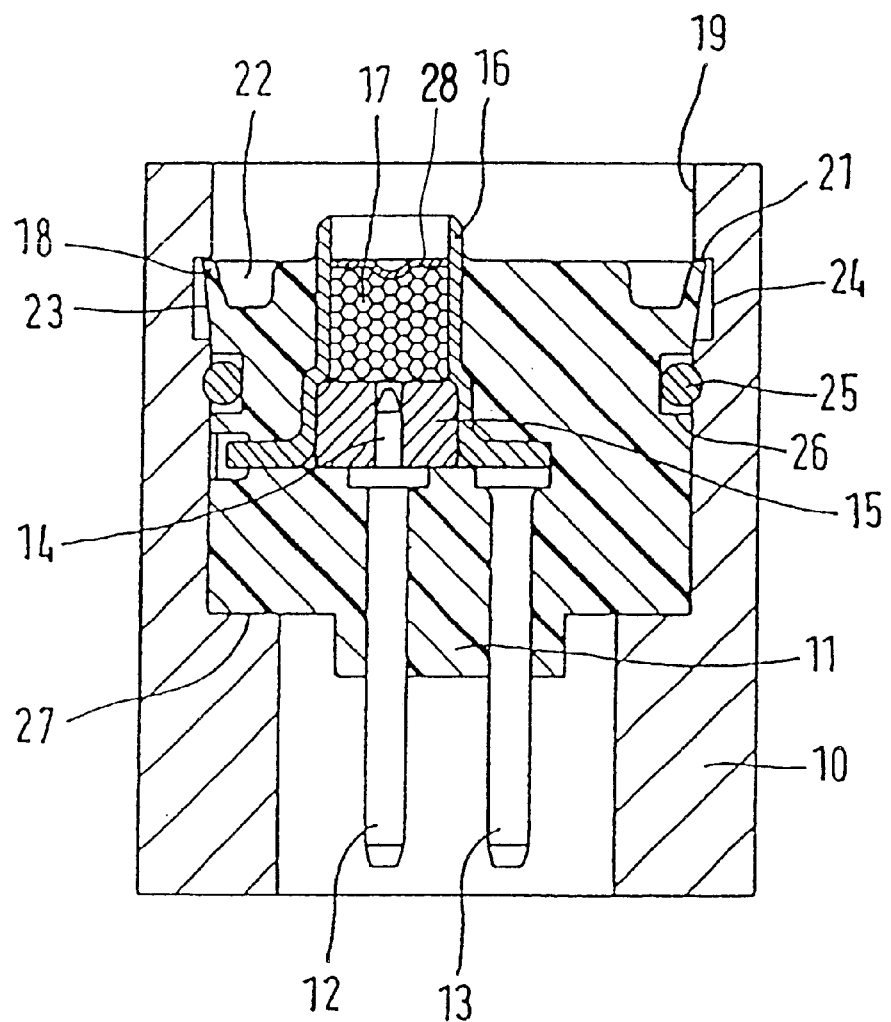

IGNITION ELEMENT, IN PARTICULAR FOR PYROTECHNIC MIXTURES

This is a 371 of PCT International Application No. PCT/EP97/07163, filed Dec. 19, 1997.

BACKGROUND OF THE INVENTION

The invention relates to an ignition element, in particular for pyrotechnic mixtures.

Known EP 0 618 424 A1 is an ignition element which has two contact pins, between which a resistor element, for example a metal film element or an incandescing wire, is arranged. An ignition charge adjoins the resistor element. As soon as current is supplied to the contact pins, the ignition charge ignites because of the high temperature of the resistor element. Such ignition elements are used, for example, for igniting gas generators for use with air bags or safety belt tighteners.

Moreover, the ignition element has a carrier body. This is, for example, a plastics body, by means of which the external geometry of the ignition element is established and the individual components are protected. The carrier body of the ignition element is, for example, screwed or flanged in a holder of an air bag. For this purpose, the carrier body is introduced into the holder in such a way that the operating side, on which the ignition charge of the ignition element is arranged, is directed inwardly for example in the direction of a gas generator for inflating an air bag. In this way, the contact side, to which current can be supplied by way of the contact pins, is directed outwardly. To secure the ignition element a part of the holder is flanged around so that the ignition element is fixed in the holder and can no longer be pulled out in the direction of the contact side.

Both the flanging and the screwing of the ignition element in the holder are associated with high assembly expenditure because it must always be ensured that the ignition element is sealed tightly with the holder. Also, no gas is to be allowed to escape when there are high gas pressures on the operating side of the ignition element, these pressures occurring, for example, when an air bag is inflated. With flanged ignition elements leakages can occur because the flanging can be damaged due to the sudden great forces when the air bag is inflated.

SUMMARY OF THE INVENTION

An object of the invention is to create an ignition element which can be assembled in a holder quickly and easily.

The ignition element in accordance with the invention has a pyrotechnic ignition charge on the operating side of a carrier body and contacts on the contact side of the carrier body. Current is supplied to a resistor element by way of the contacts for the ignition of the ignition charge. The carrier body is held in the holder, for example of an air bag, a safety belt tightener or similar. For this purpose, in accordance with the invention, the carrier body has at least one integrally moulded stop spring which engages into a stop shoulder of the holder. For the assembly of the ignition element in the holder the carrier body is simply inserted into the holder until one or more stop springs engage into stop shoulders provided on the holder. The assembly of an ignition element in the holder is therefore simplified considerably. No costly operating steps such as flanging and no additional fastening elements such as screws are necessary.

The stop spring is preferably arranged on the operating side of the carrier body so that the stop spring additionally improves the seal between the ignition element and the holder.

In order to simplify the assembly capability, the stop shoulder is circumferential in the holder. A cylindrical carrier body can therefore be inserted into a likewise cylindrical holder in any rotational position. In this respect, the stop spring is preferably likewise circumferential so that it acts as a sealing lip. This further improves the seal between the carrier body of the ignition element and the holder.

In a preferred development of the ignition element the carrier body has a recess on the operating side in the region of the stop spring. After the ignition of the ignition charge by means of the supply of current to the contacts on the contact side of the carrier body, a pressure is produced on the operating side and therefore also in the recess, with the pressure pressing the stop spring against the inner surface of the holder. The bearing pressure between the stop spring and the holder is increased with increasing pressure on the operating side. An additional O-ring or another additional sealing can frequently be omitted owing to the seal which is guaranteed in this way. If the stop spring and the inner surface of the holder are formed in such a way that they abut each other in the unloaded state, an adequate seal is already guaranteed with little pressure.

In another preferred embodiment the inner dimensions of the holder in the region of the stop spring are smaller than the outer dimensions of the unloaded stop spring, with the result that the stop spring in the holder is prestressed. This further improves the seal.

To absorb the compressive forces arising during the ignition of the ignition charge, for example when an air bag is inflated, the holder has a steep shoulder which the carrier body abuts with the contact side. A displacement of the ignition element in the direction of the contact side is therefore prevented. The compressive forces therefore do not act on the stop spring and do not have to be absorbed by it. An impairing of the seal due to the gas pressure can therefore not occur in contrast to known ignition elements which are held in the holder by means of screwing or flanging around. Rather, the pressure on the operating side of the ignition element increases the seal between the latter and the holder because, when the pressure increases, the stop spring is pressed more greatly against the inner surface of the holder.

BRIEF DESCRIPTION OF THE DRAWING

The invention will be explained in more detail in the following with reference to a preferred embodiment and with reference to the single FIGURE of the drawing.

DETAILED DESCRIPTION OF THE PREFERRED EMBODIMENT

An ignition element accommodated in a holder 10 is shown in the represented diagrammatic sectional view. Provided in a substantially cylindrical carrier body 11 of the ignition element, the carrier body consisting of plastics material, are two contact pins 12, 13, the contact side pointing downwards in the drawing. The contact pin 12 has a projection 14 which is connected to a metal film element 15 used as resistor element. The contact pin 13 is firmly connected to a metallic receiving part 16 in which there is a pyrotechnic ignition charge 17. For the ignition of the pyrotechnic ignition charge 17, current is supplied to the two contact pins 12, 13, with the metal film element 15 being heated as a result. Pressure is built up on the operating side due to the ignition of the pyrotechnic ignition charge 17, the operating side pointing upwards in the drawing.

To accommodate the carrier body 11 in the holder 10, the carrier body has an integrally moulded circumferential stop spring 18 which engages in the holder 10 on a circumferential stop shoulder 21. The carrier body 11 and the stop spring 18 are manufactured in one piece from plastics material. For assembly, the carrier body 11 is introduced into the holder 10 from the top in the drawing. Because the outer diameter of the stop spring 18 is larger than the diameter of a bore 19 of the holder 10, the stop spring 18 is inwardly compressed. As soon as the stop spring 18 is at the height of the stop shoulder 21, the stop spring 18 snaps outwardly because the diameter of the groove 24 is larger than the diameter of the bore 19.

Furthermore, the carrier body 11 has, at its front, an annular recess 22 which is open towards the operating side. The annular recess 22 directly adjoins the circumferential stop spring 18. The pressure building up on the operating side of the ignition element after the ignition of the pyrotechnic ignition charge 17 therefore acts directly on the stop spring 18. An outer surface 23 of the stop spring 18 is therefore pressed against an inner surface of the groove 24 in the holder 10. The seal between the carrier body 11 and the holder 10 is therefore guaranteed.

In addition, an O-ring 25 is provided for the sealing, being arranged in a circumferential groove 26 of the carrier body 11. The O-ring 25 is likewise used for the sealing between the holder 10 and the carrier body 11.

The bore 19 ends at a steep shoulder 27. The contact side of the carrier body 11 rests on the steep shoulder 27. The ignition element is prevented from being pressed out of the holder 10, even with high pressures on the operating side of the carrier body 11, due to the steep shoulder 27. The distance between the stop spring 18 and the contact side of the carrier body corresponds to the distance between the stop shoulder 21 and the steep shoulder 27, so that the stop spring 18 does not have to absorb any axial forces.

For the assembly of the carrier body 11 in the holder 10, it is introduced into the holder 10, in the drawing from above. Because the outer diameter of the circumferential stop spring 18 is larger than the outer diameter of the carrier body 11 which corresponds to the diameter of the bore 19 of the holder 10, the stop spring 18 is compressed inwardly as soon as the stop spring 18 is introduced into the holder 10. The carrier body 11 is introduced into the holder 10 until the contact side of the carrier body 11 sits on the steep shoulder 27. As soon as the carrier body abuts the steep shoulder 27, the stop spring 18 engages behind the stop shoulder 21 into the groove 24. The carrier body 11 is therefore no longer displaceable in the holder 10 in the axial direction.

What is claimed is:

1. An ignition element comprising:

a holder including a stop shoulder on an internal surface, a carrier body provided in the holder, the carrier body including an integrally molded stop spring arranged on its operating side engaging the stop shoulder of the holder;

a receiving part provided in the carrier body, the receiving part being open at the operating side;

at least one contact connected to the receiving part and extending therefrom on a contact side of the receiving part opposite the operating side;

a pyrotechnic ignition charge provided in the receiving part; and a cover covering the pyrotechnic ignition charge in the receiving part.

2. The ignition element according to claim 1, wherein the receiving part is cylindrical.

3. The ignition element according to claim 1, wherein the stop shoulder is circumferential.

4. The ignition element according to claim 3, wherein the carrier body is substantially cylindrical and the stop spring is circumferential.

5. The ignition element according to claim 1, wherein the carrier body is supported in the holder on the contact side by a steep shoulder.

6. The ignition element according to claim 1, wherein the carrier body has in the region of the stop spring a recess open to the operating side, so that after the ignition of the ignition charge the stop spring is pressed against an internal surface of the holder.

7. The ignition element according to claim 1, wherein the stop spring is prestressed when the carrier body is inserted into the holder.

* * * * *